No. 633,280. Patented Sept. 19, 1899.
J. R. BLAKESLEE.
DIE AND TOOL FOR UPSETTING TUBES.
(Application filed July 9, 1898.)
(No Model.)
-FIG. I-
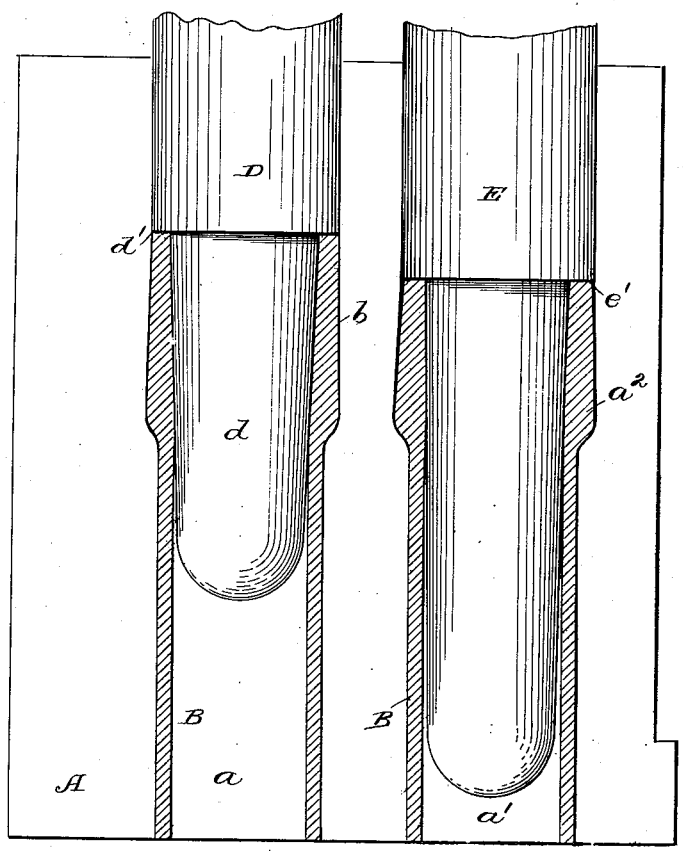
-FIG. II-
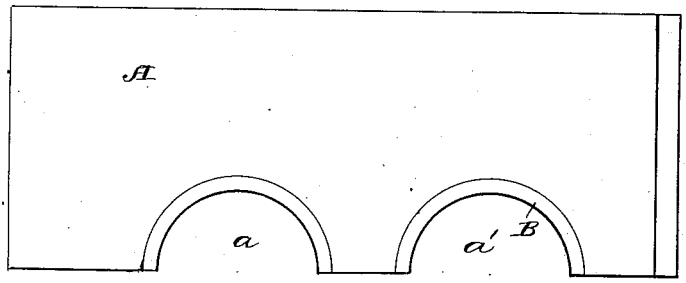
WITNESSES:
J. C. Turner
D. D. Davies
INVENTOR
J. R. Blakeslee
BY J. D. Fay
ATTORNEY.

UNITED STATES PATENT OFFICE.

JOHN R. BLAKESLEE, OF CLEVELAND, OHIO, ASSIGNOR TO THE AJAX MANUFACTURING COMPANY, OF SAME PLACE.

DIE AND TOOL FOR UPSETTING TUBES.

SPECIFICATION forming part of Letters Patent No. 633,280, dated September 19, 1899.

Application filed July 9, 1898. Serial No. 685,476. (No model.)

*To all whom it may concern:*

Be it known that I, JOHN R. BLAKESLEE, a citizen of the United States, and a resident of Cleveland, county of Cuyahoga, and State of Ohio, have invented a new and useful Improvement in Dies and Tools for Upsetting Tubes, of which the following is a specification, the principle of the invention being herein explained and the best mode in which I have contemplated applying that principle so as to distinguish it from other inventions.

Heretofore in upsetting boiler-tubes and analogous articles in dies two difficulties have presented themselves: First, the male die becomes so tightly wedged in the article to be upset as to withdraw the article with the male die as the latter is withdrawn, and, second, it has been found almost impossible to avoid crimping, wrinkling, corrugating, or what is known as "cold-shutting" on the part of the upset portion of the tube. My invention obviates both these difficulties.

The annexed drawings and the following description set forth in detail certain mechanism embodying the invention, such disclosed means constituting but one of various mechanical forms in which the principle of the invention may be used.

In said annexed drawings, Figure I represents a side elevation of one die-section, showing two half-dies and their accompanying tools, the tube being shown in section; and Fig. II is a plan view of one-half of the two-part die in which the tubes are upset.

The die A is made in two half-sections, each section being formed with two half-dies, respectively, $a$ and $a'$, in which the two operations of upsetting the tube are performed. The half-sections of the dies are attached to suitable gripping mechanism adapted to cause said die-sections to grip and firmly hold the end of the tube B, and die $a$ is formed at its upper portion with an enlargement $b$, having a contour conforming approximately with the ultimate conformation of the end of the tube to be upset. Die $a'$ is formed with a similar enlargement $a^2$, having a contour of the exact conformation or dimension of the article to be upset.

The male die D for the first operation is formed with a working surface $d$ of gradually-decreasing periphery from the top downward. The second male die is of similar conformation, being longer in length, but having its working face cylindrical, or substantially so, in shape, so as to impart a cylindrical surface to the inside of the tube, the portion between the said working face and the extremity of the die being tapered to permit the die to enter the tube with facility. Male die D is provided with the upset-forming shoulder $d'$, and a male die E is provided with an upset-forming shoulder $e'$.

The enlarged upset portion $b$ of the die $a$ is of gradually-increasing diameter from its outer to its inner portion—that is, from the top downward—that is, its surface is that of a frustum of a cone whose smaller diameter is nearer the outer end of the die. The portion $a^2$ of the die $a'$ is similarly formed, the inclination of the cone-surface, however, being greater than that of the die $a$. This inclination of such upset portions of said dies is a very important feature of my invention and serves two purposes. First, the increased diameter of the upset portion being as described, the nearer the point of entrance of the male die, the tube after being given its upset formation is wedged in the female dies and is hence prevented from being withdrawn therefrom on the withdrawal of the male die before the female dies open up for the removal of said tube. The removal of such tube is hence not dependent upon the gripping means. The prevention of the withdrawal of the tube with the male die is important, such withdrawal necessitating the removal by hand of the tube from said die, to which it under such conditions becomes very firmly attached, thereby increasing the length of time for performing the operation, decreasing the output of the machine, and increasing the cost of production, at the same time subjecting the tube to the liability of being marred, spoiled, and possibly destroyed by such hand removal, which often requires great force in its application. The male die $d$ being tapered in its formation, the inclination of the upset portion $b$ of the female die need not be so great as that of die $a'$ when the working face of the male die is cylindrical, or substantially so, inasmuch as a slight movement of the conical die out of the tube causes the entire die to loosen and permits of its easy withdrawal thereafter. In the case of the cylindrical die, however, the pull upon the tube on the withdrawal of the male die is not momentary, as in the other case, but continuous, and hence the resistance which such tube offers must be correspondingly greater. Such increased resistance is furnished by the increased inclination of the portion $a^2$ of the die $a'$ over that in die $a$. Second, such inclination of the female dies prevents the "crimping" or cold-shutting of the metal on being upset—that is, it prevents the change of location of the molecules with the loss of cohesion between such molecules. Whenever metal has been upset against a fixed cylindrical or substantially cylindrical surface and the direction of travel of the die has been parallel with such surface, this cold-shutting has always occurred, creating thereby a weakness in the metal, which was apparent on its surface. This is due to the friction of the metal upon the said cylindrical surface and the consequent obstruction to the easy flow of the molecules of the metal into their new positions—that is, the metal is bent upon itself instead of compressed in one direction and expanded in another. In my invention, however, it will be noted that the surface fixed relatively to the tube is not cylindrical, but inclined, permitting thereby sufficient lateral flow to overcome the cold-shutting at such surface. Moreover, where, as in the case of die E, a cylindrical surface is used such surface is upon the moving die and not upon the fixed die, so that the said cylindrical surface moves in the direction of the movement of the changing molecules, and hence with the melecules and not against them. The friction, and hence cold-shutting, of the molecules contiguous to such cylindrical surface is overcome. It is apparent that the same principle might be applied where it is desired to give the outer surface of a tube a cylindrical conformation. As shown in Fig. II, the die is made in two parts, whereby it may be opened and the upset tube removed therefrom without difficulty.

Other modes of applying the principle of my invention may be employed instead of the one explained, change being made as regards the mechanism herein disclosed, provided the means covered by any one of the following claims be employed.

I therefore particularly point out and distinctly claim as my invention—

1. In dies for upsetting boiler-tubes and analogous articles, the combination of a female die having an upset-forming portion of increased diameter from the top downward, with the male die having an upset-forming portion of decreasing diameter from the top downward, substantially as set forth.

2. In dies for upsetting boiler-tubes and analogous articles, the combination of a two-part die, having an upset-forming opening of greater diameter at its lower portion than at its upper portion, and a male die of greater diameter at its upper portion than at its lower portion, substantially as set forth.

3. In dies for upsetting boiler-tubes and analogous articles, the combination of a separable die, having an upset-forming opening of increasing diameter from its entrance downward, and a male die provided with an upset-forming shoulder and of decreasing diameter from said shoulder downward along its upset-forming portion, substantially as set forth.

4. In dies for upsetting ends of boiler-tubes, the combination of a separable female die adapted to receive the end of such tube and a male die having a cylindrical or substantially cylindrical formation and adapted to enter said female die, said female die having an upset-forming opening of varying diameter, a portion of said opening being of smaller diameter than a second portion farther removed from the point of entrance of said male die, substantially as set forth.

Signed by me this 3d day of June, 1898.

JOHN R. BLAKESLEE.

Attest:
  D. T. DAVIES,
  J. C. TURNER.